United States Patent [19]

Zimatore et al.

[11] 3,863,509

[45] Feb. 4, 1975

[54] KEYBOARD FOR THE PRESELECTION OF ELECTROMAGNETIC SIGNALS

[75] Inventors: Carmelo Zimatore; Amedeo Pezzini, both of Rome, Italy

[73] Assignee: Autovox S.p.A., Rome, Italy

[22] Filed: Jan. 3, 1974

[21] Appl. No.: 430,589

[30] Foreign Application Priority Data

Jan. 17, 1973 Italy .................................. 47733/73

[52] U.S. Cl. ............... 74/10.33, 74/10.27, 74/10.29, 74/10.39, 74/10.35, 334/7

[51] Int. Cl. ............................................ F10h 35/18

[58] Field of Search ............ 74/10.27, 10.31, 10.33, 74/10.35, 10.37, 10.22; 334/7

[56] References Cited

UNITED STATES PATENTS

| | | | |
|---|---|---|---|
| 2,253,433 | 8/1941 | Kellogg | 74/10.37 |
| 2,503,066 | 4/1950 | Plensler | 74/10.33 |
| 3,602,051 | 8/1971 | Olah | 74/10.39 |
| R27,179 | 9/1971 | Newman | 74/10.33 |

*Primary Examiner*—Samuel Scott
*Assistant Examiner*—Randall Heald
*Attorney, Agent, or Firm*—Browdy and Niemark

[57] ABSTRACT

A keyboard for receivers, especially autoradios.

9 Claims, 11 Drawing Figures

KEYBOARD FOR THE PRESELECTION OF ELECTROMAGNETIC SIGNALS

The invention pertains to the field of keyboards for television or radio receivers, especially autoradios, for pre-setting them for the reception of a number of desired transmitting stations.

Such keyboards for radio and television sets are per se known. They comprise keys of variable lengths, fitted with cams, which can be locked in position, each position corresponding to the tuning of the receiver to a given frequency, and control means, which, upon the actuation of one of the keys, transmit this position to the tuning circuit of the receiver. However, the known keyboards of this type occupy a considerable space, which forms a disadvantage where, as it is the case with motorcar dashboards, space is at a premium and therefore the opening or receptacle allotted for the installation of the receiver therein is of necessity small. This disadvantage becomes particularly felt where also, in addition to the receiver and its keyboard, also a cassette recorder or player must be installed in it.

The object of the invention is therefore to supply a keyboard, especially for an autoradio, which occupies a relatively small and narrow space without reducing the accuracy of its construction and operation and can be easily mass produced.

The invention attains this object by providing a keyboard comprising a flat bolt or slider, coupled to the tuning mechanism of the receiver, and a plurality of cams, one for each key of the keyboard, which are linked with one end to the base plate of said keyboard and with their other end to said bolt. Each cam features two lateral ears. On each key a cam is pivotable into any desired inclination with respect to the key stem and can be locked in this inclination. By pressing a key, its cam engages between the ears of the corresponding eared cam and swings it around till it is oriented in the same direction as the key cam. Since the eared cams are linked to said bolt and the latter to the tuning system of the receiver, the inclination imparted to the eared cam will determine the transmitter to which the receiver is tuned once the key has been pressed in. Conversely, to determine the inclination at which a desired transmitting station will be tuned in when the key is pressed, it will be sufficient to unlock the key cam, bring it into engagement with the eared cam and tune the receiver, by the manual tuning mechanism, to the desired transmitting station. Since, as already stated, the bolt is connected with the tuning system, this latter mechanism will displace the bolt and consequently impart to the eared cams and to the key cams engaged within their ears an inclination corresponding to the tuned-in transmitter. After having locked the key cam into this inclination, the key can be retracted, and the same operation can be performed, one at a time, on the remaining keys, and thus each key will memorize a given transmitting station.

Keyboards of such a construction will be of extremely reduced dimensions, and especially they will be very flat, since their height is practically the sum of the thickness of the baseplate, the height of the bolt, the thickness of the cams and that of a coverplate.

To eliminate any slack or play between the component parts of the keyboard and to obtain the necessary accuracy in the positioning of all cams, both the eared cams and the keys are spring biased against their guide surfaces. Thus the eared cams are provided with bores presenting two downwardly convergent sides, which are resiliently biased against the pivots on which the cams are fulcrumed. Similarly the pins by which the two terminal eared cams are fulcrumed to the bolt are pressed by springs against two convergent sides of corresponding holes in said bolts. Finally, in one embodiment of the invention, where one end of each key is guided in a slot of the base plate, the lateral play of this end is eliminated by a spring loaded inclined surface, which biases said end against one side of said slot. The invention will be better understood by the following description, made with reference to the attached drawings, of two of its possible embodiments. In the drawings:

Figure 9:
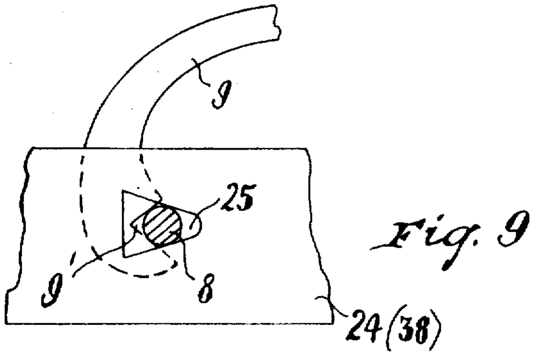
FIG. 9 shows on a larger scale how the pins of the eared cams are spring biased against the two convergent sides of the bolt.
Figure 10:
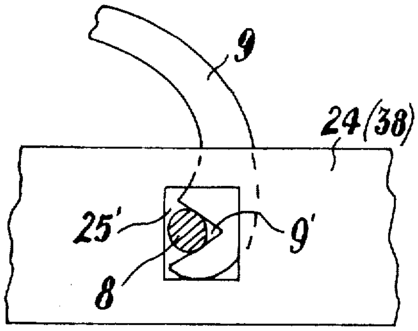
FIG. 10 shows, also on an enlarged scale, the biasing of said pins against one vertical side of a rectangular hole in the bolt.
Figure 7:
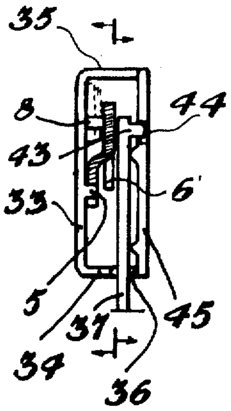
FIG. 7 is a cross section through FIG. 6.
Figure 2:
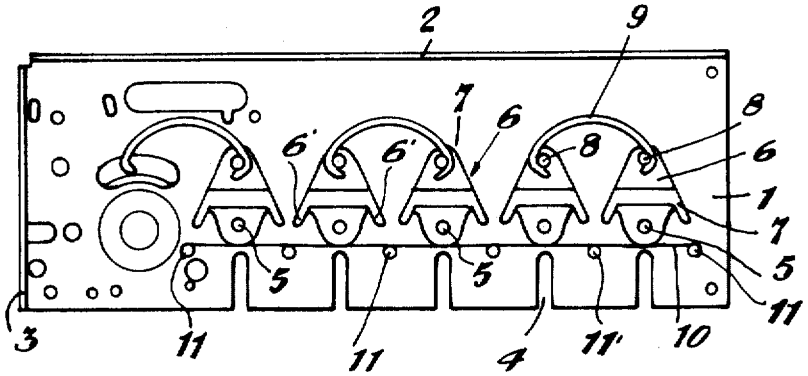
FIG. 2 is a top view according to FIG. 1, from which the bolt and keys are removed to better show the coaction between the spring loaded eared cams.

With reference to FIGS. 1–5, a base plate 1 is provided with a flange 2 on one of its long sides, and a flange 3 on one of its short sides, both flanges being perpendicular to said plate. Into the other long side of plate 1 is cut a number of slots 4, which open towards the exterior. On plate 1 a plurality of relatively short pivot pins 5 of a relatively small diameter are arranged in a row. A cam 6 is oscillatable on each pivot pin (five cams being shown in the figures). Each cam, generally indicated at 6, is provided with two ears 6′ which are coplanar with the main cam body 7, and with a lobe 6″ interposed said two ears, said lobe, as it is clearly shown in FIG. 7, being raised relatively to said main body. The lobe 6″ of each cam presents a through opening into which penetrates said pivot 5, around which said cam 6 is oscillated. The ears 6′ are given a length such that an ideal line connecting their ends passes through the centers of rotation of cam 6″, i.e., through the centers of pivots 5. From the main body 7 of each cam 6 a pin 8 projects in the same direction as lobe 6″. The pins 8 of two adjacent cams 6 are interconnected by a flat curved leaf spring 9, whose ends are provided with flared notches 9′ (FIGS. 9 and 10). Pins 8 penetrate either into the triangular holes 25 or the rectangular holes 25′ of a bolt 24, so that a pin 8 penetrating into a rectangular hole 25′ is biased by one end of spring 9 against one vertical surface of said hole, whereby it is rendered capable of sliding up and down on this surface. Obviously hole 25' may also be conferred another shape, it being merely essential that it presents a flat surface, which is perpendicular to the longitudinal axis of said bolt 24 (FIG. 10).

Figure 11:
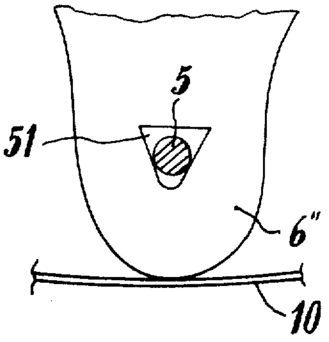
FIG. 11 shows, also on an enlarged scale, how the two downwardly convergent sides of the bores in the eared cams are pressed resiliently against their pivots.

In order to prevent any play between the cams 6 and the plate 1, also the lobes 6'' are provided with triangular through apertures 51 (FIG. 11) with a downwardly directed vertex, while a leaf spring 10, whose ends are anchored to studs 11 of plate 1, biases the two sides of said vertex against pivots 5. The leaf spring 10 is supported, intermediate its ends, by a row of additional studs 11', to warrant a uniform pressure of spring 10 on lobes 6''. Obviously the relatively long leaf spring 10 may be replaced by a plurality of separate springs, one for each lobe, and while it would be sufficient to provide merely two cams 6 with through apertures 51, from the point of view of reducing production costs it is more convenient to render all cams alike, that is to provide each cam with the same triangular aperture 51.

Figure 3:
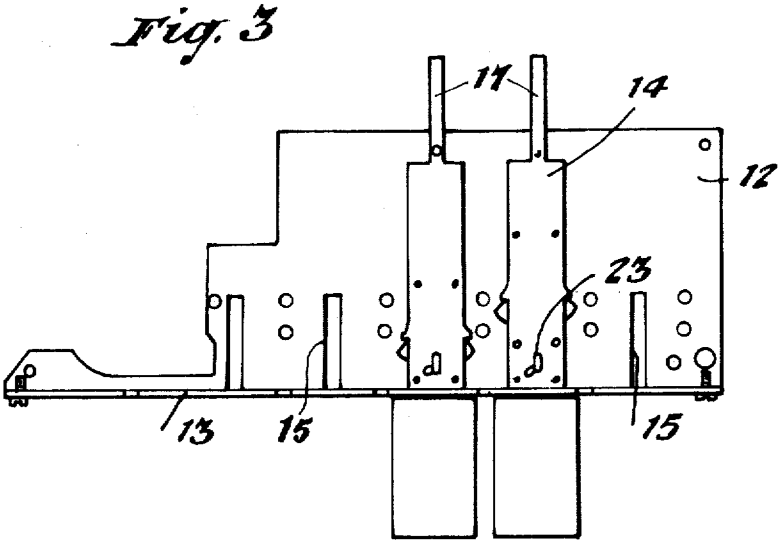
FIG. 3 is a view from below of a plate serving to guide the keys of said first embodiment.
Figure 4:
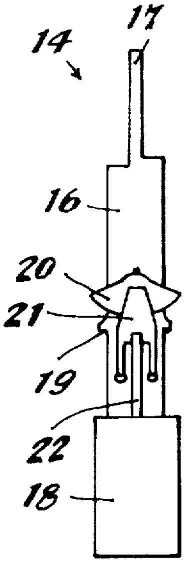
FIG. 4 is a top view of one key according to FIG. 1.

FIG. 3 shows an essentially rectangular second plate 12 with merely two of its five keys 14 assembled on it. A vertical flange 13, running along its longest side, presents openings through which the keys are inserted and within which they are slidable. This longest side of plate 12 is provided with a row of slots 15. The key, better shown in FIG. 4, consists of a generally rectangular stem 16, whose one end terminates in a narrower portion 17, while its other end serves to guide a key button 18 of a generally parallelepipedal shape. Stem 16 is provided with two lateral projections 19 and at a point along its centerline there is pivoted a sector-shaped cam 20 pressed against said stem by a resilient tongue 21. A rod-shaped member 22, provided with a projecting part 23 (FIG. 3) passing through the stem 16, is linked by an opening at one of its ends to a (not shown) member provided in the interior of the key button 18, while its other end overlaps the tongue 21. The key button 18 is slidable along the key stem 16 between a fore end position and a rear end position. In the rear end or completely extracted position of key 14, the end of member 22 is lifted away from tongue 21, to render cam freely oscillatable on stem 16. In its forward end position, i.e., in the inserted position of the key, said end of member 22 is pressed against tongue 21, thus locking cam 20 in a desired inclination relatively to the key axis.

Figure 5:
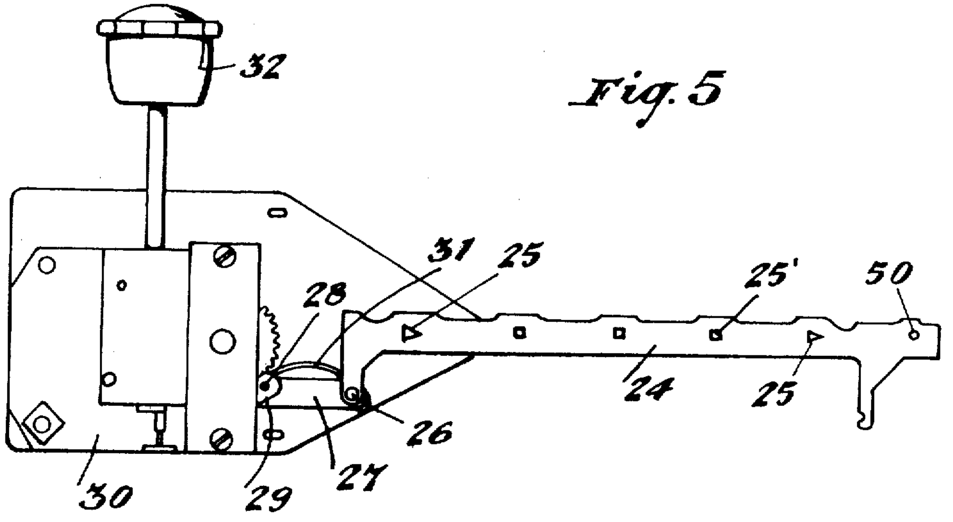
FIG. 5 is a bottom view of the bolt according to FIG. 1 and of the manual tuning gear connected with it.

FIG. 5 shows the exact shape of the bolt 24 with its row of holes, one for each cam. The terminal holes are triangular, the intermediate ones 25' being here square. As already stated, each hole coacts with a pin 8 of a cam 6. Since the pins 8 are biased by the springs 9 against two converging sides of the triangular holes 25 or respectively against one side of the square holes 25', while the two downwardly converging sides of the through apertures 51 in lobes 6'' of each cam 6 are pressed against pivots 5' by the spring 10, as already explained with reference to FIG. 11, the bolts are perfectly guided and an exact coordination of all parts is obtained in any position assumed by the bolt.

One end of bolt 24 is connected by a pin 26 to one end of a link 27, whose other end is connected by a pin 28 to a platelet 2, which is in turn connected with a rotatably mounted shaft of the per se known gear mechanism for the manual tuning of the receiver, which here is fastened to a plate 30. An arcuate spring 31 interconnects pins 26 and 28 to eliminate any play between bolt 24 and platelet 29, without hindering the movement of the parts. It is advisable to confer a triangular or rectangular shape also to the holes through which pass the pins 26 and 28, although this is not shown in the figures.

In order to assemble the keyboard, the cams 6 are fitted upon the pivots 5 of plate 1 and the pins 8 of pairs of adjacent cams are connected together by the arcuate leaf springs 9. If, as in the present case, the number of cams is uneven, the pin of one terminal cam is connected by an arcuate spring 9 with a pin 50 which is rigid with the bolt 24.

Figure 1:
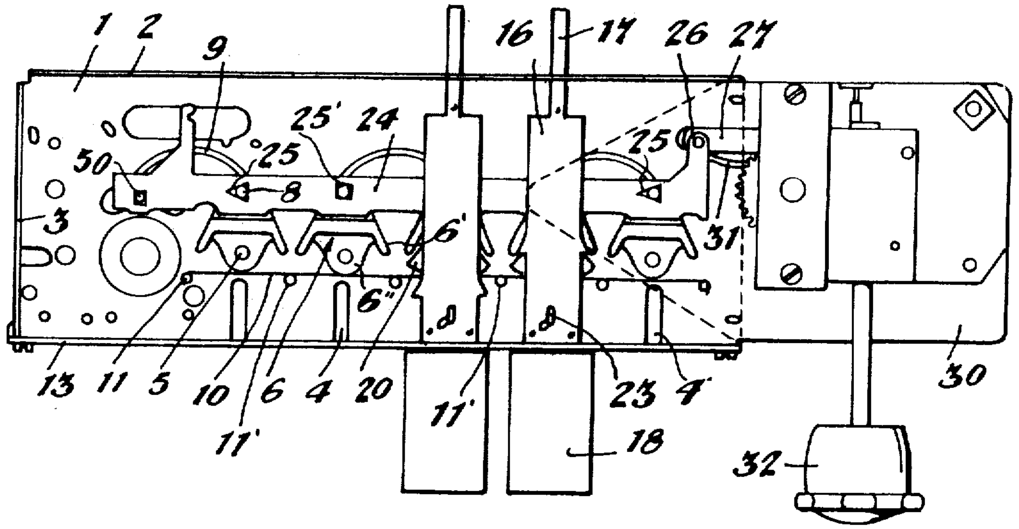
FIG. 1 is a top view of the first embodiment of the invention, wherein, for the sake of clarity, the slider for the uncoupling of the keyboard from the gear for the manual tuning and three of the five keys are eliminated.

The keys 14 are inserted through the slots in flange 13 of plate 12 from the inside. For this purpose, their buttons 18 must be detached from their stems 16. This is done by exerting a pressure upon the rodshaped member 22, so that its end, which in the assembled state of the keyboard is connected with the (not shown) member provided in the interior of the keyboard button 18, is disconnected therefrom. Thus button 18 may be removed and the stem 16 may be inserted from inside into the corresponding slot of flange 13. Successively the button 18 is reinserted upon stem 16 from the outside of flange 13. The stroke of the stem within said slot is limited between the rear face of the parallelepipedal button 18 and the lateral projections 19 of the stem 16, which projections cannot pass through the slots in the flange 13. The bolt 24 is connected with the gear for manual tuning over the link 27 and a platelet 29, as already described in connection with FIG. 5. Plate 12 is fastened above plate 1 in such a manner that the slots 4 of the latter register with the slots 15 of the former to form upper and lower guide channels for the rod-shaped key members 22. The narrower portions 17 of the stems 16 are introduced into corresponding slots provided in flange 2 of plate 1. In this manner, each key is accurately guided in the keyboard. Plate 12 is applied laterally upon plate 30, which carries the manual tuning mechanism, whereby the holes 25 and 25' of the bolt 24 are connected with the cams 6 by the pins 8. Plates 1, 12 and 30 are assembled together by screws or other fasteners. The knob of the manual tuning gear is indicated at 32. The thus assembled keyboard appears as represented in FIG. 1, from which three keys have been removed for the sake of better clarity.

Figure 6:
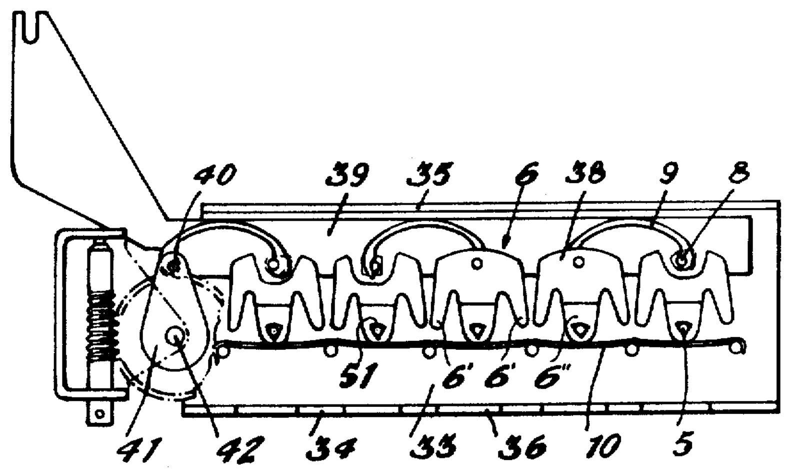
FIG. 6 is a bottom view of a second embodiment of the keyboard.

In the second embodiment of the keyboard, the longer sides of an essentially rectangular base plate 33 are provided with flanges 34 and 35 forming right angles with it. Flange 34 carries openings 36 for the insertions therethrough and the guiding of the keys 37. Also in this embodiment a row of spaced apart pivots 5 projects from the baseplate 33. Each pivot penetrates through a triangular hole 51 provided in the lobe 6'' of a cam 38. Cams 38 are similar to cams 6, with their main body raised relatively to lobe 6'' (FIG. 7) and provided with two ears 6', whose ends lie on an ideal line passing through the centers of pivots 5. Similarly to the first embodiment, cams 38 are pressed against their pivots 5 either by a long leaf spring 10 or by a number of individual leaf springs, and the pins 8 of said cams 38 are connected two by two by arcuate springs 9. To better show these connections, the upper portions of three cams are broken away in FIG. 6.

A bolt 39 is pivoted by a pin 40 to a cam 41 fastened to the rotatable shaft 42 of a known gear for manual tuning. Similarly to the bolt 24 of the first embodiment, also bolt 39 is fitted with an array of holes, each hole engaging a pin 8 of a cam 38.

Figure 8:
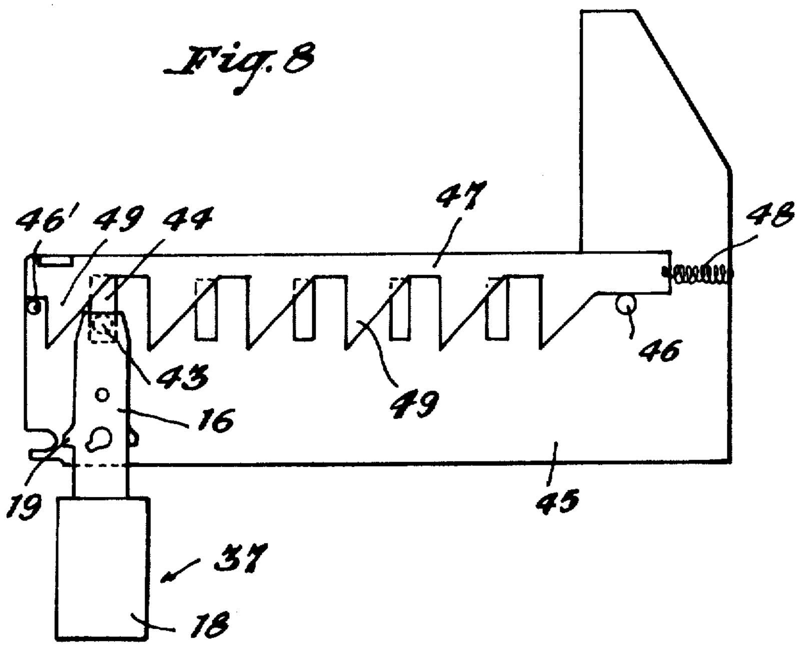
FIG. 8 is a bottom view of the base plate of the second embodiment and of its slider, with all keys but one removed for the sake of clarity.

In lieu of the narrower portion 17, the stem 16 of each key 37 has at its end opposite to button 18 a stud 43, which guides said end within a slot 44 of a plate 45, which is fastened to plate 33 in a parallel relationship. As shown in FIG. 8, a slider 47 is guided on plate 45 by pins 46, 46' or similar means.

The slider consists of an elongate flat metal member, of which one of the longer sides coacts with one of the longer sides of plate 45, while its opposite side is fitted with sawtooth like serrations 49, whose slopes may also have various inclinations, for instance two on each sloped side.

The slider is biased by a spring in such a manner that the sloped sides of its teeth keep the studs 43 pressed against the right side (as seen in FIG. 8) of slots 44, thereby eliminating any play between the key stems 16 and the plate 45. The slider also serves to disconnect the mechanism for manual tuning from the bolt 39.

The operation of both embodiments of the keyboard for memorizing a set of transmitting stations is the following: the key buttons 18 are completely pulled back, until the end of the rod-shaped members 22 are lifted from the resilient tongue 21 and thereby the cams 20 are released. By turning knob 32 of the mechanism for manual tuning, the receiver is tuned to a desired transmitting station. This operation also causes a corresponding lateral displacement of bolt 24 (or of bolt 39 respectively). This displacement swings all cams 6 around their pivot 5 until they assume a given inclination, this inclination corresponding to the tuned-in station. Thereafter the key is pressed inward, until the key cam 20 engages the ears 6' of cams 6 (or of cams 38 respectively) and is forced to assume their inclination. By pressing button 18 further inward, the key cam 20 is locked in position by the depressed end of member 22. By retracting the key, until the projections 19 of its stem 16 abut against the interior surface of flange 13 of plate 1 (or against flange 34 of plate 33 respectively), but without drawing further back the key button 18 (since this latter movement would release the key cam 20), a third key position is obtained, in which the key is inoperative, since the key cam 20 is completely disengaged from the eared cam 6. This position of one key permits to perform the same storage operations on the other keys or to use the manual tuning of the receiver. When one of the keys 14 (or of the keys 37 respectively) is again pressed in, the key cam 20 is forced between the ears of cam 6, and the ensuing displacement of bolt 24 (or bolt 39 respectively) switches the tuning circuit of the receiver to the precedently stored station.

What is claimed is:

1. In a keyboard for receivers, particularly for autoradios, for pre-setting them to the reception of as many transmitters as there are keys on said keyboard, in which keyboard said keys are of a variable length and carry, fulcrumed to them, cams which can be locked in varying inclinations with respect to the key axis, said cams coacting with means to transmit said inclination to the tuning system of said receiver, the improvement that:

each key cam coacts with cams, whose one end is pivotably mounted on a plate, each cam presenting an ear at both sides of its pivot, said ears being coplanar with said key cam and capable of being moved into engagement with the latter;

each of the opposite ends of said eared cams is linked by a pin to a flat bolt, one end of said bolt being disconnectably linked to the tuning system of said receiver, said eared cams and said bolts forming the means to transmit the key cam inclinations to said tuning system.

2. In a keyboard according to claim 1, the improvement that the pins of said opposite ends of at least the terminal eared cams are resiliently pressed against two converging sides of corresponding through holes of said bolt, the pins of the intermediate cams being spring biased against one side of polygonal holes in said bolt, while the other end of each of said eared cams is provided with holes having two downwardly converging sides, which are spring biased against stationary pivots.

3. In a keyboard according to claim 2, the improvement that the springs biasing said pins of said eared cams against the sides of said holes are arcuate leaf springs.

4. In a keyboard according to claim 3, the improvement that the ends of said arcuate springs are notched, the converging surfaces of said notches engaging the pins of said eared cams.

5. In a keyboard according to claim 3 the improvement that the ends of said arcuate springs have notches in the shape of the segment of a circle of a diameter larger than the diameter of the cam pin engaging in it.

6. In a keyboard according to claim 2, the improvement that the spring biasing said two downwardly converging sides of the holes in the eared cams against said stationary pivots is a flat spring supported, intermediate its ends, by a row of additional studs to warrant a uniform pressure of said spring upon said cams.

7. In a keyboard according to claim 1, the improvement that said bolt is pivoted to a cam of the manual tuning gear in such a manner that the pin of said cam is pressed against one side of a polygonal through hole in the bolt by one of the notched ends of an arcuate leaf spring, whose other notched end presses against a pin of one of the eared cams.

8. In a keyboard according to claim 1, the improvement that the end portion of each eared cam containing the hole through which it is pivoted to the keyboard base plate forms a lobe which is raised relatively to the ears and the remaining portions of said cam.

9. In a keyboard according to claim 1, the improvement that one end of each key is guided in the interior of said keyboard by a guide pin integral with said key end sliding within a slot in said keyboard, and that a serrated slider is resiliently biased in said keyboard in such a manner, that the sloped sides of its teeth keep said guide pins constantly pressed against one side of said slots.

* * * * *